Patented June 6, 1950

2,510,783

UNITED STATES PATENT OFFICE 2,510,783

VINYL FLUORIDE POLYMERIZATION PROCESS

Frederick Lewis Johnston, Claymont, and Donald Cargill Pease, Wilmington, Del., assignors to E. I. du Pont de Nemours & Company, Wilmington, Del., a corporation of Delaware No Drawing. Application December 18, 1946, Serial No. 717,094

7 Claims. (Cl. 260—92.1)

This invention relates to the polymerization of polymerizable substituted ethylenes and more particularly to an improved process of polymerizing vinyl fluoride.

Heretofore, vinyl fluoride has been polymerized with the aid of various peroxide catalysts such as benzoyl peroxide, diethyl peroxide, and other peroxides. However, vinyl fluoride polymerizations with the aid of these catalysts are not entirely satisfactory in that when the catalyst concentration is low enough to facilitate the formation of tough, orientable, medium and high viscosity polymers and to avoid the formation of brittle, unorientable, low viscosity polymers, pressures in excess of 100 atmospheres are required to effect a measurable amount of polymerization even at the temperatures at which these peroxide catalysts are known to be most active for the polymerization of vinyl fluoride; further, pressures in excess of 150 atmospheres are necessary in order to obtain practical yields of polymer, e. g. pressures of at least 250 atmospheres and 400 atmospheres being required for benzoyl peroxide and diethyl peroxide catalysts, respectively.

An object of this invention is a new and improved process of polymerizing vinyl fluoride. A further object is a process of preparing polyvinyl fluoride of excellent quality, which process can be conveniently practiced at moderate temperatures and pressures far below those heretofore required, and which process is well adapted to operation in equipment much less specialized and consequently markedly more economical than any process heretofore found practical. Other objects will be apparent from the description of the invention given hereinafter.

The above objects are accomplished according to the present invention by subjecting monomeric vinyl fluoride to polymerization conditions in the presence of an azo compound having the formula R—N=N—R' wherein R and R' are radicals joined to the azo nitrogens through aliphatic carbon. Preferred conditions include carrying out the polymerization reaction in a liquid medium under superatmospheric pressures and elevated temperatures in the presence of such an azo catalytic compound wherein the carbons attached to azo nitrogen are also attached to a cyano group.

The present invention may be carried out in a batch-wise manner by charging a suitable reaction vessel with water and an azo catalyst, e. g. alpha,alpha'-azodiisobutyronitrile. The vessel is swept with oxygen-free nitrogen, closed and cooled. Nitrogen is removed by evacuation and the vessel is placed in a heated shaker machine and connected to a source of vinyl fluoride monomer. Recording thermocouples are inserted into the vessel. The reaction vessel is charged with vinyl fluoride, to the desired pressure, and heating and agitation are started. The amount of water present in the reaction mixture is in general at least one-half the weight of the vinyl fluoride monomer. Upon reaching reaction temperature the reaction starts and is normally followed by a pressure decrease due to utilization of monomer charged. Pressure within the system is maintained throughout the reaction period either by the addition of fresh vinyl fluoride or by decreasing the free space in the reactor by forcing in more water. Once the reaction is complete, as evidenced by cessation of pressure drop, the vessel is cooled, bled of excess gaseous reactants, opened and the reaction mixture discharged. The polymer is isolated from the reaction medium by means well known to the art, such as by filtering and drying. While the polymer is usually in a satisfactory form at this stage, it may be purified by washing, solvent extraction, steam distillation, vacuum drying, etc.

Although a batchwise process is described above, the present invention can also be carried out by conducting the polymerization on a continuous or semi-continuous basis.

The following examples, wherein proportions are by weight unless otherwise indicated, illustrate specific embodiments of the present invention.

Example I

A stainless steel reactor capable of withstanding high pressure was thoroughly flushed with oxygen-free nitrogen until it contained no oxygen. The following charge was then placed in the reactor, precautions being taken so that air and oxygen were not admitted during the charging; 150 parts deoxygenated distilled water, 0.150 part alpha,alpha'-azodiisobutyronitrile, and 150 parts vinyl fluoride monomer (acetylene-free, containing less than 20 P. P. M. oxygen). The reactor was of such a size that the above charge, when in the liquid state, occupied about ¾ of the space in the reactor. The reactor was closed and connected through a valve to a source of additional deoxygenated distilled water. The reactor was placed in a device which supplied vigorous agitation to the contents by rapid end-to-end shaking throughout the run. By means of external heating, the contents were brought to a temperature of 70° C. within one hour after starting the run. During this warm-up period it was necessary on two occasions to bleed off part of the vinyl fluoride monomer in order to prevent the pressure from exceeding 82 atmospheres. The reaction temperature was kept in the range of 66–72° C. and the pressure within the range of 68–82 atmospheres during the remainder of the run. After a total of 18 hours from the start of the run the reactor was cooled. Remaining vinyl fluoride monomer was bled off and the reactor was opened. After drying the product there was obtained 75.8 parts of polyvinyl fluoride in the form of a white cake which could be readily crumbled to powder. The intrinsic viscosity ($\eta$) of this polymer was 3.413. This value was calculated from the relative viscosity of the polymer at 0.25% concentration in dimethyl formamide solution at 144° C. by the following relationship:

$$[\eta] = \frac{\ln \eta \text{ rel.}}{C}$$

where $\ln \eta$ rel. is the natural logarithm of the relative viscosity and C is the concentration in grams of polymer per 100 ml. of solvent.

Example II

The same equipment and charge were used as for Example I. The contents of the reactor were brought to a temperature of 41° C. within a period of 45 minutes. Pressure within the reactor was maintained within the range of 69–91 atmospheres throughout the remainder of the run. Temperature was maintained in the range of 40–44° C. After a total of 19 hours from the start of the run the reactor was cooled, remaining vinyl fluoride monomer was bled off, and the reactor was opened. After drying the product, 35.8 parts of polyvinyl fluoride was obtained in the form of a crumbly cake. The intrinsic viscosity determined as in Example I was 5.676.

Example III

Into a stainless steel reactor similar to the one used in Example I the following charge was placed, care being taken to exclude oxygen. The charge included 90 parts deoxygenated distilled water, 60 parts redistilled methanol, 0.150 part alpha,alpha'-azodiisobutyronitrile, and 157 parts vinyl fluoride monomer of the same purity as that used in Example I. The reactor was fitted with a thermocouple for recording internal temperatures and connected through a valve to a gauge for recording pressures. The reactor was mounted in an agitating device as in Example I and the contents were brought to a temperature of 80° C. within a period of one hour. Temperature was maintained at 80° C. and pressures were maintained within the range of 65–100 atmospheres throughout the remainder of the run. After a total of 18 hours from the start of the run the reactor was cooled, remaining vinyl fluoride monomer was bled off, and the reactor was opened. After drying the product, there was obtained 47.6 parts of polyvinyl fluoride in the form of a fine white powder. The intrinsic viscosity determined as in Example I was 0.528.

Example IV

The same equipment and procedure was used as for Example III. The charge consisted of 150 parts tert.-butyl alcohol, 0.150 part alpha,alpha'-azodiisobutyronitrile, and 150 parts vinyl fluoride monomer. The reactor was closed, placed in the agitator, and the contents were brought to a temperature of 70° C. within a period of 45 minutes. The temperature was maintained in the range of 70–80° C. and the pressure was maintained within the range of 26–47 atmospheres throughout the remainder of the run. After a total of 18 hours from the start of the run, the reactor was cooled and opened as before. The dried product consisted of 115.5 parts of polyvinyl fluoride in the form of a crumbly cake. The intrinsic viscosity determined as in Example I was 1.483.

Example V

The general equipment and procedure of Example I was employed and the following charge placed in the reactor: 150 parts deoxygenated distilled water, 0.150 part alpha,alpha'-azobis (alpha,gamma-dimethylvaleronitrile), and 150 parts vinyl fluoride monomer. The reactor was closed and mounted in an agitator as in Example I. The contents of the reactor were brought to a temperature of 46° C. within a period of one hour. Temperature was maintained within the range of 44–46° C., and pressures were maintained within the range of 58–68 atmospheres throughout the remainder of the run. After a total of 17½ hours from the start of the run the reactor was cooled, excess gaseous reactants were bled off, and the reactor was opened. After drying the product there was obtained 4.8 parts of polyvinyl fluoride in the form of a soft crumbly cake.

Portions of the polyvinyl fluoride prepared according to Examples I–V were pressed separately between flat platens at a temperature of 200° C. under the 10,000 pounds/square inch pressure for 3 minutes, producing transparent water-white molded sheets which were tough and stiff. Narrow strips were cut from these sheets and permanently elongated 400% and rendered highly oriented by lengthwise stretching.

It will be understood that the above examples are merely illustrative and that the instant invention broadly comprises subjecting monomeric vinyl fluoride to polymerization conditions in the presence of an azo compound having the formula

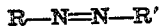

wherein R and R' are radicals joined to the azo nitrogens through aliphatic carbon.

The azo catalysts used in this invention are compounds in which both valences of the azo group (—N=N—) are satisfied by different carbons aliphatic in character. The preferred azo compounds are those wherein both valences of the azo group are satisfied by aliphatic, including alicyclic, radicals bonded to the nitrogen from teritiary aliphatic carbon further bonded to a negative substituent which is neutral with respect to acidity of the class consisting of nitrile, carbalkoxy, and carbonamide groups. Examples of such azo catalysts include alpha,alpha - azobis(alpha,gamma - dimethyl - valeronitrile); alpha,alpha' - azobis(alpha - methylbutyronotrile); dimethyl and diethyl alpha,alpha' - azodiisobutyrate; alpha,alpha'-azodiisobutyrocarbonamide; 1,1' - azodicyclohexane - carbonitrile; and alpha,alpha' - azobis (alpha-cyclopropylpropionitrile). Azo compounds which have an aromatic group attached to the alpha carbon such as alpha,alpha'-azobis-(alpha-phenylpropionitrile) are also useful. The preferred compounds have a cyano (nitrile) group on the carbon alpha to the azo nitrogens. The radicals which are bonded to the azo nitrogen are generally free from ethylenic and acetylenic unsaturation and each radical preferably has from 4 to 9 carbons.

More definitely, the preferred azo catalysts used in this invention are those organic azo compounds wherein the azo, —N=N—, group is bonded from both its nitrogens to tertiary carbons of the class consisting of aliphatic and cycloaliphatic carbons, in discrete radicals, preferably of 4 to 9 carbons, inclusive, the tertiary carbons being further bonded to a member from the group consisting of cyano, carbonamide, and carbalkoxy, contained in the discrete radicals, and the radicals being free from open chain carbon to carbon unsaturation and being hydrocarbon except for the cyano, carbonamide, and carbalkoxy groups. All of the heretofore mentioned specific azo compounds for use in this invention are of this defined type.

Although concentrations of azo catalysts of 0.0005%–5% are very satisfactory for the purposes of this invention, concentrations of 0.01–3% are preferred. The concentrations of catalysts are based on the weight of monomeric vinyl fluoride employed.

The process of this invention may be carried out at pressures of 25–1000 atmospheres and higher; however, it is preferred to employ pressures of 25–100 atmospheres since in so doing substantial economies in equipment and operating costs are effected.

While temperatures of 25° C.–250° C. and above are within the scope of the present invention, it is more desirable to operate in the range of 25° C.–100° C. in order to maintain the autogenous pressures of the polymerization system at a minimum.

The present invention may be carried out in polymerization media other than water. For example, the polymerization medium may comprise alcohols, ketones, acetals, ethers, esters, acids, hydrocarbons, and halogenated hydrocarbons or mixtures of these materials with each other or with water. An aqueous medium is preferred for carrying out the present invention, a mixture of methanol and water being specifically preferred. The methanol acts as a molecular weight control agent in the polymerization of vinyl fluoride, and by suitable variation in the proportions of methanol to water it is possible to prepare vinyl fluoride polymers differing widely in molecular weight and in molecular weight distribution. For example, a vinyl fluoride polymer prepared in a medium comprising 5 parts of methanol and 95 parts water is nearly as high in molecular weight and melt viscosity as the polymer prepared in water alone. A polymer similarly prepared but in a medium comprising 25–40 parts methanol and 75–60 parts of water is characterized by medium molecular weight and has a medium range melt viscosity. In a medium comprising 60 parts methanol and 40 parts water the vinyl fluoride polymer obtained is still lower in molecular weight and melt viscosity. It is preferred that the total amount of the liquid medium employed be at least half by weight of the amount of monomeric vinyl fluoride employed. Thus with 100 parts of liquid medium, up to 200 parts of monomeric vinyl fluoride would be employed. For practical considerations it is not feasible to operate the process with less than about one part of monomeric vinyl fluoride per 100 parts of liquid medium.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing tough, orientable polyvinyl fluoride comprising subjecting to a temperature of 25° C.–100° C. and a pressure of 25–100 atmospheres a mixture of monomeric vinyl fluoride as the sole polymerizable component and a liquid polymerization medium in the presence of 0.01%–3%, by weight of said vinyl fluoride, of an organic azo compound wherein the azo, —N=N—, group is bonded from both its nitrogens to tertiary carbons of the class consisting of aliphatic and cycloaliphatic carbons, in discrete radicals, said tertiary carbons being further bonded to a member from the group consisting of cyano, carbonamide, and carbalkoxy, contained in said discrete radicals, and said radicals being free from open chain carbon to carbon unsaturation and being hydrocarbon except for said cyano, carbonamide, and carbalkoxy groups.

2. Process as set forth in claim 1 wherein said discrete radicals contain from 4 to 9 carbons, inclusive.

3. Process as set forth in claim 1 wherein said organic azo compound is alpha,alpha'-azodiisobutyronitrile.

4. Process as set forth in claim 1 wherein said organic azo compound is alpha,gamma-dimethylvaleronitrile.

5. Process as set forth in claim 1 wherein said liquid polymerization medium consists of 5–60 parts methanol and 95–40 parts water.

6. Process as set forth in claim 5 wherein said organic azo compound is alpha,alpha'-azodiisobutyronitrile.

7. Process as set forth in claim 5 wherein said organic azo compound is alpha,gamma-dimethylvaleronitrile.

FREDERICK LEWIS JOHNSTON.
DONALD CARGILL PEASE.

REFERENCES CITED

The following references are of record in the file of this patent:

UNITED STATES PATENTS

| Number | Name | Date |
|---|---|---|
| 2,376,014 | Semon et al. | May 15, 1945 |
| 2,419,008 | Coffman et al. | Apr. 15, 1947 |
| 2,419,009 | Coffman et al. | Apr. 15, 1947 |
| 2,419,010 | Coffman et al. | Apr. 15, 1947 |
| 2,471,959 | Hunt | May 31, 1949 |

OTHER REFERENCES

Beilstein, Hanbuch der organischen Chemie, vol. 4, page 563, Berlin, 1922.